F. Fredly
Wood Molding Machine.
Nº921.
Patented Sep. 15, 1838.
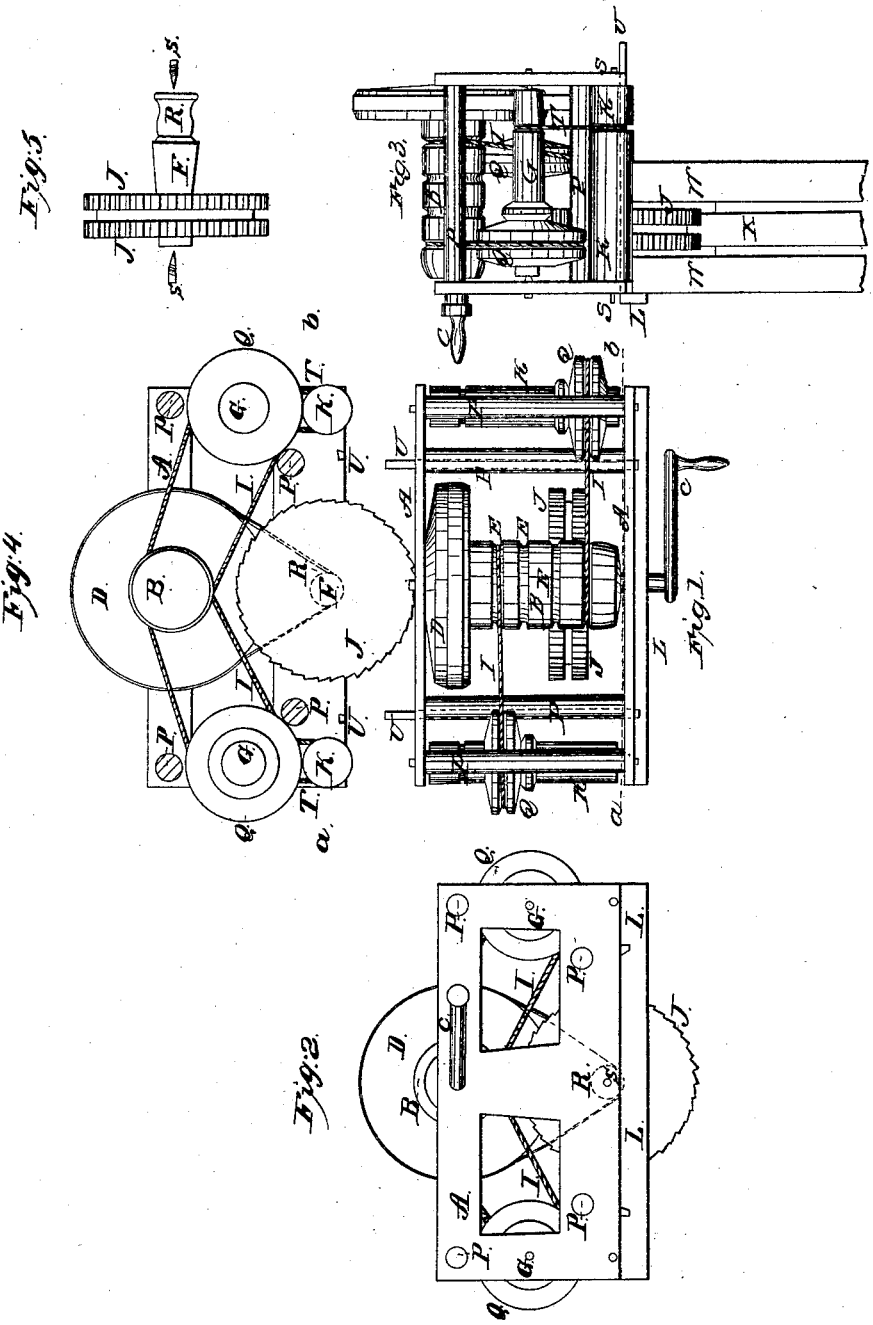

UNITED STATES PATENT OFFICE.

FREDERICK FREDLY, OF SUGAR VALLEY, PENNSYLVANIA.

MACHINE FOR TONGUING, GROOVING, AND BEADING BOARDS.

Specification of Letters Patent No. 921, dated September 15, 1838.

*To all whom it may concern:*

Be it known that I, FREDERICK FREDLY, of Sugar Valley, Logan township, Center county, and State of Pennsylvania have invented a new and useful Machine for Tonguing, Grooving, Molding, and Sawing Boards and Performing other Work, called "Fredly's Portable Joiner," which is described as follows, reference being had to the annexed drawings of the same, making part of this specification.

Figure 1, represents a top view of the machine. Fig. 2, a side view. Fig. 3, an end view. Fig. 4, a longitudinal section through the machine at *a*, *b* Fig. 1. Fig. 5, cutters and shaft F detached.

The letters of reference refer to the same parts in the several figures.

A, A, represent the sides of the frame or stock between which are placed the several rollers, axles wheels pulleys, cutters, &c. Said sides are made of a rectangular shape, of suitable length, breadth, and thickness and are placed at a proper distance apart to contain the parts before enumerated, and are connected together by round or square bars P and are perforated with circular apertures to admit the gudgeons of the rollers and axles and the ends of the connecting bars; and also dovetailed apertures to admit dovetailed sliding arms to the ends of which a flat guide is fastened. B, the main shaft or axle turning in round apertures in the sides of the stock near the top thereof—one of its ends projecting beyond the side of said stock, on which a crank C is fastened for turning it by hand and which gives motion to all the movable parts of the machine. On said shaft is fastened a large wheel D, called the driving wheel around which passes a band leading around a pulley R represented by dotted lines on the axle F, below it, containing the cutters J; and several small pulleys, or grooves E, are also on said main shaft, in or around which are extended bands I leading around pulleys Q Q, on axles G G, at the ends of the stock around which last mentioned axles are passed other bands T, T, stretched around rollers K, K, below said axles G, G, which move over ways W, W, (hereafter described) for propelling the machine forward.

The cutters J, J, represented in the drawings are for tonguing boards and resemble two thick circular saws placed as far apart as the width of the tongue to be formed, and fixed permanently on the axle F whose ends are concave to admit the points of screws S, passing through the sides of the stock against which points the axle turns. The cutter for making the groove resembles a single circular saw of a thickness equal to the width of the required groove and is likewise fixed to a shaft of a similar shape to the one F above described.

The several cutters are shaped according to the description of work required to be performed and are fixed permanently to their respective shafts which are therefore changed whenever it is required to change the work, the shafts turning against the points of screws in the manner above described.

L, represents the gage for guiding the cutters in a proper direction. It consists of a rectangular flat piece fastened to the ends of two parallel dovetailed rods or bars U, U, moving transversely in dovetailed grooves in the sides of the stock before mentioned for allowing the rods with the gage to be drawn in or out according to the thickness of the board to be tongued, grooved, or molded, which gage, slides against the outside of one of the ways W. W, W, represent the ways between which the board X, to be cut is clamped and over which the machine travels the rollers K at the ends turning upon the ways.

In using this machine for tonguing boards first secure a board between the ways W W in a proper position for the cutters J to operate on it effectually—then place the machine on the ways in a proper position for the rollers K to move over them—the cutters being between them; with the right hand lay hold of the crank C and the left place on the forward roller P' and bear gently upon it—then turn the crank C and the friction of the rollers on the ways will cause the machine to advance and the cutters to revolve which will take off the sides of the board—leaving the center uncut to form the tongue which will be between the cutters.

In forming the groove a single cutter is substituted for the double cutter, which takes out the center of the edge of the board—leaving the sides uncut.

The ways, between which the board to be tongued or grooved is secured may be clamped to the side of a carpenter's bench or secured in any other manner preferred.

The invention claimed and desired to be secured by Letters Patent consists—

In the mode of tonguing and grooving and beading boards &c., by means of revolving cutters which work in a frame that travels on ways, between which the boards, &c., to be operated upon are clamped, said frame having a gage to regulate the cut of the cutters, the whole being constructed and operating in the manner substantially as herein described.

FREDERICK FREDLY.

Witnesses:
WM. P. ELLIOT,
EDMUND MAHER.